United States Patent Office 3,549,767
Patented Dec. 22, 1970

3,549,767
METHOD OF CONTROLLING INSECTS AND ACARINAE, EMPLOYING CERTAIN ACYLATED HYDRAZONES AND HYDRAZINES
Herbert Esser, Allschwil, and Kurt Gubler, Riehen, Switzerland, assignors to Geigy Chemical Corporation, Ardsley, N.Y., a corporation of New York
No Drawing. Filed Dec. 14, 1967, Ser. No. 690,394
Claims priority, application Switzerland, Dec. 16, 1966, 18,097/66
Int. Cl. A01n 9/20
U.S. Cl. 424—327
9 Claims

ABSTRACT OF THE DISCLOSURE

Method for controlling insects and acarinae, and new compositions for use therein which are characterized by a content of certain acylated hydrazones, hydrazines or amines derived from an aromatic or araliphatic benzaldehyde or from an araliphatic alcohol and having an aliphatic acyl moiety linked to a nitrogen atom of the hydrazono, hydrazino or amino bridge, which content is sufficient to kill the insects or acarinae, and can be held so low that a mortality rate of 100% is attained only after four days or an even longer period, because of an antifeeding effect exercised within about 24 hours on the insects or acarinae to be controlled.

DESCRIPTION OF THE INVENTION

The present invention concerns new compositions and processes for controlling insects, acarinae and their preliminary development stages using acylated hydrazones, hydrazines and amines as active substances; it also concerns processes for the production of the new compositions.

The modern, commercially important insecticidally active substances belong, chiefly, to the group of esters of acids of phosphorus, the carbamates and halogenated hydrocarbons. In many cases such insecticides have considerable toxicity to warm blooded animals and plants.

Benzaldehyde hydrazones which, optionally, are substituted by alkyl or benzylidene at the nitrogen atom which can carry substituents have become known as active substances in pesticides from Belgian Pat. No. 672,178. The insecticidal action of N-benzoylated hydrazones of araliphatic aldehydes was studied on eating and sucking insects [Chemical Abstracts 45, 6335 h (1951); 46, 8311 dc (1952); U.S. Dept. of Agriculture, Bureau of Entomology and Plant Quarantine E815, E840]. These compounds showed weak insecticidal properties at comparative concentrations.

It has now been found that compositions which contain as active ingredients certain hydrazones, hydrazines and amines acylated by means of aliphatic acid radicals, are excellently suitable for controlling insects and acarinae in all stages of their development. The active substances, for all practical purposes, are not phytotoxic and have only low toxicity to warm blooded animals. Such acylated hydrazones, hydrazines and amines correspond to the formula

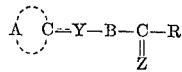—Y—B—C—R

(I)

wherein

represents bridging members of an unsubstituted or substituted aromatic-homocyclic ring system,
Y represents an aliphatic hydrocarbon bridging member,
B represents an unsubstituted or substituted hydrazono, hydrazino or amino group,
Z represents oxygen or sulphur, and
R represents an unsubstituted or substituted aliphatic radical which can be bound to the group

—C—
‖
Z by a hetero atom.
In general Formula I,

preferably represents the phenyl nucleus which can be unsubstituted or mono- or poly-substituted. Examples of substituents thereof are halogens, alkyl, alkoxy, alkylthio, alkylamino, dialkylamino, acylamino, halogenoalkyl, nitro, cyano, hydroxyl, amino, carboxyl, carbamoyl and N-substituted carbamoyl, carbamoyloxy, N-substituted carbamoyloxy, alkoxycarbonyl and methylenedioxo groups. Several of the substituents can be identical or different. Y is preferably a hydrocarbon bridging member, in particular an alkylene or a substituted or unsubstituted alkylidene radical having from 1 to 6 carbon atoms, or an alkenylene or alkenylidene radical having 2 to 6 carbon atoms; these radicals can have straight or branched chains. Examples of substituents of hydrazono, hydrazino and amino groups B are aliphatic hydrocarbon radicals, particularly lower alkyl and lower alkenyl radicals.

The aliphatic radical R is preferably an alkyl or alkenyl radical which can be substituted, e.g., by halogen, hydroxyl, amino or mono- and di-alkylated amino. Such radicals R- can also be bound by way of a hetero atom, preferably by way of oxygen or sulphur, to the group

—C—
‖
Z

Tests to determine the action of the acylated hydrazones, hydrazines and amines of Formula I on insects, acarinae and all preliminary stages of their development showed that these active substances are good to very good stomach and contact poisons with a correspondingly good long-lasting effect. They can be used to combat biting and sucking insects and acarinae, e.g., insects of the families Muscidae, Stomoxidae and Culicidae such as polyvalent resistant and normally sensitive house flies (*Musca domestica*), stable flies (*Stomoxys calcitrans*) and mosquitos (e.g., *Aedes aegypti*, *Culex fatigans*, *Anopheles stephensi*), on insects of the families Curculionidae, Bruchidae, Dermestidae, Tenebrionidae, Chrysomelidae, Tineidae, e.g., granary weevils (*Sitophilus granaria*), bean beetles (*Bruchidius obtectus*), larder beetles (*Dermestes vulpinus*), Attagenus and Anthrenus, yellow meal worms (*Tenebrio molitor*), Colorado potato beetles (*Leptinotarsa decemlineata*), clothes moths (*Tineola biselliella*), on insects of the families Pyralidae, e.g., Mediterranean flour moths, Blattidae, e.g., German cockroaches (*Phyllodromia germanica, Periplaneta americana, Blatta orientalis*), on insects of the family Locustidae, e.g., desert locusts (*Locusta migratoria*), of the families Noctuidae, Tortricidae and Yponomeutidae, e.g., *Prodenia litura*, oak leaf roller (*Tortrix viridana*), ermine moth (*Yponomeuta malinella*), etc.; in addition the active substances have a good action against the larvae and adult stages of acarinae, e.g., of the families Tetranychidae, Arachnidae, Ixodidae, Argasidae, as well as a good ovicidal action on the eggs of insects and acarinae.

Application of the active substances in the most various forms for use, for example, as dusts, wettable powders, emulsions or oil solutions, gives good results against the insects and spiders mentioned above.

The range of action of the active substances is widened by admixture with synergists and other auxiliaries having a similar action such as piperonyl butoxide, and the insecticidal and acaricidal action is improved. In addition, the active substances can be used with attractants and baits. Also, the active substances can be mixed and applied with substances having bactericidal, fungicidal or or nematicidal properties and with other insecticides or acaricides, so that the biological activity of the compositions according to the invention is broadened.

Compositions according to the invention which contain, as active substances, acylated hydrazones of the general Formula II

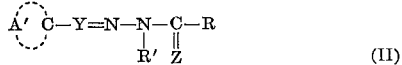
(II)

wherein

R, Y and Z have the same meanings as in Formula I,

represents an unsubstituted or substituted phenyl radical, and

R' represents a lower alkyl or lower alkenyl radical or hydrogen, are of particular importance for the protection of plants and stored goods, as well as for soil disinfection because of the excellent larvicidal properties of the active substances. Tests on larvae of different families of insects have shown that the preferred active substances are those having halogen, cyano, nitro, hydroxyl and/or a lower alkyl radical as substituents of a phenyl nucleus

and in which the group $$-\underset{\underset{Z}{\|}}{C}-R-$$

represents an alkanoyl radical: for example the following:

$N_1$-acetyl-$N_2$-4-chloro-benzaldehyde hydrazone,
$N_1$-acetyl-$N_2$-2,4-dichlorobenzaldehyde hydrazone,
$N_1$-propionyl-$N_2$-2,4-dichlorobenzaldehyde hydrazone,
$N_1$-isobutyryl-$N_2$-4-chloro-benzaldehyde hydrazone,
$N_1$-chloracetyl-$N_1$-methyl-4-chloro-benzaldehyde hydrazone,
$N_1$-isobutyryl-$N_2$-4-cyano-benzaldehyde hydrazone,
$N_1$-isocaproyl-$N_2$-4-nitro-benzaldehyde hydrazone, and
$N_1$-acetyl-$N_2$-2-hydroxy-3-methyl-benzaldehyde hydrazone.

In addition, compositions which contain, as active substances, acylated hydrazines and amines of the formula

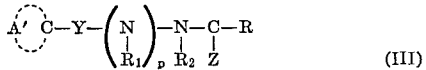
(III)

wherein

R, Y and Z have the same meanings as in Formulas I and II, $R_1$ represents hydrogen, an alkyl or alkanoyl radical,
p represents the number 0 or 1, and
$R_2$ represents hydrogen or a lower alkyl radical, are of importance for plant protection and soil disinfection because of the equally good insecticidal and acaricidal properties of the active substances.

The compositions according to the invention can be administered in surprisingly low concentrations, because it has been found that, unexpectedly, while the insects to be controlled may all be killed only after 4 to 6 days, or even after a longer period, they cease feeding on the plants in the area under control within about 24 hours after the field has been treated with the novel compositions.

This is particularly surprising because structurally closely related compounds such as those of the formula

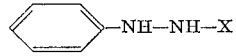

wherein X represents acetyl or propionyl, show mortality rates which are only in the range of at most 3% even when applied in concentrations of about 1 pound of active ingredient per 100 gallons of insecticidal composition (about 0.12% weight/volume), and even those higher derivatives which show better mortality rates do not appear to possess the anti-feeding effect shown particularly by the benzyl hydrazone derivatives used as active substances in the compositions according to the invention.

The minimum effective amount of active ingredient for achieving this favorable effect lies at about 0.5 pound per acre, dependent somewhat on the crop, the insects to be controlled and the particular active compound used. Even higher amounts, e.g., one or two pounds per acre can be applied without harmful effects on the crop or on the organism of warm-blooded animals.

Active ingredients in compositions according to the invention which are preferred because of good anti-feeding effects are the compounds falling under the formula

(IV)

wherein Q represents one of the groupings

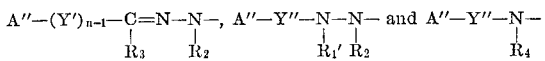

in which groupings

A" represents an optionally substituted phenyl radical any substituents of which are selected from chlorine, bromine, methylenedioxy, hydroxy, cyano, nitro, amino, di-lower alkyl-amino, lower alkanoyl-amino, N-lower alkyl-carbamoyloxy, lower alkyl and lower alkoxy;
Y' represents alkylene;
$R_3$ represents hydrogen or alkyl;
n is one of the integers 1 and 2;
and the total number of carbon atoms of the bridge member

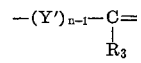

ranges from 1 to 6;
Y" represents alkylene of from 1 to 6, and each of $R_1$', $R_2$ and $R_4$ represents hydrogen or alkyl of at most 5 carbon atoms;
Z represents oxygen or sulfur, and
R represents alkyl of at most 10 carbon atoms, alkenyl of from 2 to 5 carbon atoms having from one to two double bonds, halogeno-lower alkyl, lower alkoxy or lower alkylthio.

Still more preferred as the aforesaid active ingredients are those falling under Formula IV in which Z represents oxygen and R represents alkyl of from 2 to 5 carbon atoms; and most preferred are those in which Z and R have the last-given meaning, Q represents the first of the aforesaid three groupings and A" represents phenyl or chlorophenyl.

Where not specifically defined otherwise, alkyl, alkenyl, alkanoyl and the like aliphatic groupings have preferably not more than 5 carbon atoms. "Lower" in connection with aliphatic radicals means that the latter have at most 4 carbon atoms.

The following nonlimitative examples describe the preparation of the active substances of Formula I. Where not expressly stated otherwise, parts and percentages are given by weight. The temperatures are given in degrees centigrade.

EXAMPLE 1

A solution of 220 parts of isobutyl hydrazine in 400 parts by volume of ethanol/water (1:1) is added to a solution of 300 parts of 4-chloracetophenone in 500 parts by volume of ethanol and 20 parts by volume of glacial acetic acid while stirring. The whole is heated to 70° whereupon crystallization begins. After cooling, the precipitate is filtered off under suction and then washed with 50% ethanol, cold abs. ethanol and heptane. The $N_1$-isobutyryl-$N_2$-(4-chloracetophenone)-hydrazone, recrystallised from ethanol/heptane, melts at 144–145°.

EXAMPLE 2

74.4 parts of methoxythiocarbonyl hydrazide are added to a solution of 98.5 parts of p-chlorobenzaldehyde in 1000 parts by volume of abs. ethanol and the suspension is stirred for 5 hours under reflux whereupon it is cooled to 0–5°. The precipitate is filtered off and recrystallised from methanol. The $N_1$-methoxythiocarbonyl-$N_2$-(4-chlorobenzaldehyde)-hydrazone obtained melts at 165–167°.

The agents according to the invention can contain the following compounds of Formula I. In the formula the symbols

X, Y, B, Z and R have the meanings given in the table below:

TABLE I

| Number | A͡C—Y | B | Z | R | M.P. or B.P./torr in °C. |
|---|---|---|---|---|---|
| 1 | Cl—⟨   ⟩—CH= | =N—NH— | O | $CH_3$ | 148–150 |
| 2 | Same as above | Same | O | $C_2H_5$ | 158–159 |
| 3 | do | do | O | i-$C_3H_7$ | 162–663 |
| 4 | do | do | O | $C_2H_5O$— | 142–143, 5 |
| 5 | Br—⟨   ⟩—CH= | do | O | $CH_3$ | 155–158 |
| 6 | Same as above | do | O | i-$C_3H_7$ | 154–155 |
| 7 | $(CH_3)_2N$—⟨   ⟩—CH= | do | O | $CH_3$ | 173–174 |
| 8 | Same as above | do | O | $C_2H_5$ | 155–159 |
| 9 | do | do | O | i-$C_3H_7$ | 151–152 |
| 10 | $CH_3CONH$—⟨   ⟩—CH= | do | O | $CH_3$ | 208–210 |
| 11 | $O_2N$—⟨   ⟩—CH= | do | O | $CH_3$ | 190–192 |
| 12 | Same as above | do | O | $C_2H_5$ | 170–174 |
| 13 | do | do | O | i-$C_3H_7$ | 183–185 |
| 14 | NC—⟨   ⟩—CH= | do | O | i-$C_3H_7$ | 168–172 |
| 15 | Cl—⟨Cl⟩—CH= | do | O | $CH_3$ | 189–191 |
| 16 | Same as above | do | O | i-$C_3H_7$ | 168–169 |
| 17 | Cl—⟨Cl⟩—CH= | do | O | $C_2H_5O$— | 121–124 |
| 18 | Cl—⟨   ⟩—CH= | do | S | $CH_3O$— | 169–171 |
| 19 | Same as above | do | S | $C_2H_5O$— | 158–160 |
| 20 | ⟨Cl⟩—CH= | do | S | $CH_3O$— | 133–135 |
| 21 | Cl—⟨   ⟩—CH= | do | S | $CH_3S$— | 180–182 |
| 22 | Cl—⟨Cl⟩—CH= | do | S | $C_2H_5O$— | 150–151.5 |
| 23 | Cl—⟨Cl⟩—CH= | do | S | $CH_3O$— | 165–167 |

TABLE I—Continued

| | A—C—Y | B | Z | R | M.P. or B.P./torr in °C. |
|---|---|---|---|---|---|
| 24 | Same as above | do | S | $C_2H_5O$ | 143–145 |
| 25 | (2,3-dihydro-1,4-benzodioxin-6-yl)—CH= | do | O | $i\text{-}C_3H_7$ | 177–180 |
| 26 | Cl—C$_6$H$_4$—CH= | =N—N(CH$_3$)— | O | $CH_3$ | 106–111 |
| 27 | Same as above | Same | O | $C_2H_5$ | 103–105 |
| 28 | do | do | O | $-CH_2Cl$ | 163–165 |
| 29 | do | do | O | $-CCl_3$ | 149–152 |
| 30 | do | do | O | $C_2H_5O-$ | 68–70 |
| 31 | Br—C$_6$H$_4$—CH= | do | O | $CH_3$ | 93–94 |
| 32 | (2-Cl-C$_6$H$_4$)—CH= | do | O | $CH_3$ | 105–109 |
| 33 | Same as above | do | O | $C_2H_5$ | 76–78 |
| 34 | (2,4-Cl$_2$-C$_6$H$_3$)—CH= | do | O | $CH_3$ | 142.5–145 |
| 35 | Same as above | do | O | $C_2H_5$ | 102–104 |
| 36 | (2,4-Cl$_2$-C$_6$H$_3$)—CH= | do | O | $CH_3$ | 153–155 |
| 37 | Same as above | do | O | $C_2H_5$ | 124–128 |
| 38 | do | do | O | $-CH_2Cl$ | 171–174 |
| 39 | (2,6-Cl$_2$-C$_6$H$_3$)—CH= | do | O | $CH_3$ | 93–95 |
| 40 | Same as above | do | O | $C_2H_5$ | 48–50 |
| 41 | (3-H$_2$N-C$_6$H$_4$)—CH= | do | O | $CH_3$ | [1] 120–123 |
| 42 | CH$_3$CONH—C$_6$H$_4$—CH= | do | O | $CH_3$ | 163–165 |
| 43 | (2,3-dihydro-1,4-benzodioxin-6-yl)—CH= | do | O | $CH_3$ | 143–146 |
| 44 | (4-O$_2$N-C$_6$H$_4$)—CH= | do | O | $CH_3O-$ | 133–134 |
| 45 | Cl—C$_6$H$_4$—CH= | =N—N(i-C$_3$H$_7$)— | O | $CH_3$ | 48–52 |
| 46 | C$_6$H$_5$—CH$_2$—CH$_2$— | —NH— | O | $-CH=C(CH_3)_2$ | 126/0.001 |
| 47 | Same as above | Same as above | O | $CH_3NH-$ | 78.5–80 |
| 48 | (Cl-C$_6$H$_4$)—CH$_2$—CH$_2$— | do | O | $CH_3$ | 151–152 |
| 49 | (Cl$_2$-C$_6$H$_3$)—CH$_2$—CH$_2$— | do | O | $CH_3$ | 117–119 |

TABLE I—Continued

| No. | A—C—Y | B | Z | R | M.P. or B.P./torr in °C. |
|---|---|---|---|---|---|
| 50 | CH₃—⟨C₆H₄⟩—CH₂—CH₂— | ...do... | O | CH₃ | 83–86 |
| 51 | ⟨C₆H₅⟩—CH= | =N—N(C₅H₁₁)— | O | C₂H₅ | |
| 52 | Same as above | =N—N(CH₂—CH=CH₂)— | O | CH₃ | |
| 53 | ...do... | =N—NH— | O | C₄H₉ | |
| 54 | ...do... | Same as above | O | CH(CH₃)—(CH₂)₂—CH₃ | |
| 55 | ...do... | ...do... | O | CH₃—(CH₂)₆— | |
| 56 | ...do... | ...do... | O | —CH₃—(CH₂)₉— | |
| 57 | ...do... | ...do... | O | —CH=CH₂ | |
| 58 | ...do... | ...do... | O | —CH=CH—CH=CH—CH₃ | |
| 59 | Cl—⟨C₆H₄⟩—CH= | =N—N(C₂H₅)— | O | CH₃ | |
| 60 | Same as above | Same as above | O | C₂H₅ | |
| 61 | Cl,Cl—⟨C₆H₃⟩—CH= | ...do... | O | CH₃ | |
| 62 | Same as above | ...do... | O | C₂H₅ | |
| 63 | Cl,Cl—⟨C₆H₃⟩—CH= | ...do... | O | CH₃ | |
| 64 | Same as above | ...do... | O | C₂H₅ | |
| 65 | ⟨C₆H₅⟩—CH₂—CH= | ...do... | O | CH₃ | |
| 66 | Same as above | ...do... | O | C₂H₅ | |

¹ Hydrochloride.

EXAMPLE 3

(a) 0.6 mol of p-chloro-benzaldehyde is dissolved in 300 ml. of abs. ethanol. 0.6 mol of ethylhydrazine is added thereto dropwise and the reaction mixture is boiled for 5 hours under reflux with stirring. The solution is then evaporated to dryness, the residue is dissolved in chloroform and the chloroformic solution is washed twice with water and dried, and chloroform is then distilled off, whereby $N^1$-ethyl-$N^2$-(p-chlorobenzaldehyde)-hydrazone is obtained as an oil.

(b) To 0.1 mol of the latter product there are added 50 ml. of pyridine, and, with simultaneous cooling and stirring, 10.2 g. of acetic anhydride are added thereto dropwise. The mixture is left standing overnight at 25° C. It is then poured into ice water and extracted twice with chloroform. The combined chloroformic extracts are washed twice with water, dried and evaporated to dryness. The residue, which is of the formula

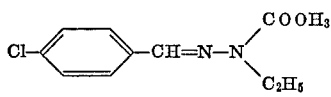

is recrystallized from petroleum ether.

EXAMPLES 4 to 6

The following compounds are obtained by repeating the above example, but using in lieu of p-chlorobenzaldehyde an equivalent amount of 3,4-dichloro-benzaldehyde, 2,4-dichlorobenzaldehyde or phenylacetaldehyde:

Ex. 4: 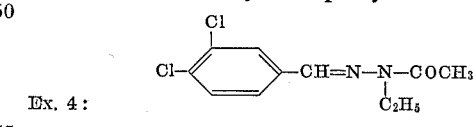

Ex. 5: 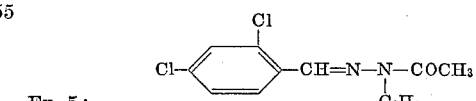

Ex. 6: 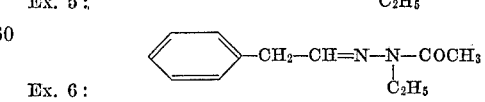

EXAMPLE 7

By repeating Example 3, but using in step (b) thereof, in lieu of 10.2 g. of acetanhydride an equivalent amount of propionic acid anhydride the compound of the formula

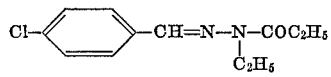

is obtained.

EXAMPLE 8

By repeating step (b) of Example 3, but using in lieu of 0.1 mol of the hydrazone employed therein as starting material an equivalent amount of benzylhydrazine there is obtained the hydrazide of the formula

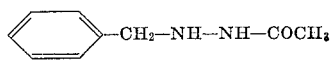

the melting point of which is 80–81°.

EXAMPLE 9

By repeating step (b) of Example 3, but using in lieu of 0.1 mol of the hydrazone employed therein as starting material, an equivalent amount of β-phenylethylamine, and in lieu of 10.2 g. of acetanhydride an equivalent amount of propionic acid anhydride, there is obtained the amide of the formula

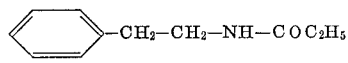

the melting point of which is 53–56°.

Tests with *Prodenia litura* (Egyptian cotton worm) and *Locusta migratoria* (migratory locust)

Fresh lettuce leaves are dipped in an acetone/water solution of active substance (depending on the solubility in water of the active substance can be previously dissolved in acetone, maximal ratio of water to acetone 50:50). After the coating of active substance has dried, they serve as feed. 20 larvae of *Prodenia litura* (12 hours old) and of *Locusta migratoria* (freshly emerged), respectively, are placed on these lettuce leaves and, on controlling daily, they are transferred to fresh leaves which have been treated in the same way. The duration of the test is 10 days (temperature 28–30°).

In the following table there is given the time in days until 100% mortality is attained.

PRODENIA LITURA (EGYPTIAN COTTON WORM)

| | Concentration in percent | Time in days until 100% mortality is attained |
|---|---|---|
| Compound No. (from Table I): | | |
| 1 | 0.05 | 2 |
| 5 | 0.05 | 4 |
| 14 | 0.05 | 3 |
| 15 | 0.05 | 6 |
| 16 | 0.05 | 4 |
| 17 | 0.05 | 5 |
| 18 | 0.05 | 4 |
| 33 | 0.05 | 5 |
| 34 | 0.05 | 5 |
| Known compound: | | |
| Cl–⟨⟩–CH=N–NHCH₃ | 0.05 | [1] 14 |

[1] 25% mortality.

LOCUSTA MIGRATORIA (MIGRATOOY LOCUST)

| | Concentration in percent | Time in days until 100% mortality is attained |
|---|---|---|
| Compound No. (from Table I): | | |
| 3 | 0.05 | 4 |
| 4 | 0.05 | 3 |
| 14 | 0.05 | 4 |
| 15 | 0.05 | 5 |
| 17 | 0.05 | 4 |
| 18 | 0.05 | 4 |
| 23 | 0.05 | 5 |
| 31 | 0.05 | 5 |
| 34 | 0.05 | 4 |
| 35 | 0.05 | 4 |
| 36 | 0.05 | 5 |
| 37 | 0.05 | 4 |
| Known compound: | | |
| Cl–⟨⟩–CH=N–NHCH₃ | 0.05 | [2] 10 |

[2] 55% mortality.

Tests with larvae of *Aedes aegypti* (mosquitoes)

The active substance is first dissolved in a little acetone and the solution is made up with tap water to 500 cc. This solution is poured into 1-litre beakers and 50 freshly emerged larvae of *Aedes aegypti* are put into each glass. Dog biscuits crumbled in water serve as food. The duration of the test is 10 days. The number of dead larvae is determined by daily control.

In the following table there is given the time in days until 100% mortality is attained.

| | Concentration in percent | Time in days until 100% mortality is attained |
|---|---|---|
| Compound No. (from Table I): | | |
| 1 | 0.001 | 3 |
| 19 | 0.001 | 3 |
| 24 | 0.001 | 4 |
| 28 | 0.0005 | 2 |
| 38 | 0.0005 | 3 |
| 40 | 0.001 | 3 |
| Known compound: | | |
| Cl–⟨⟩–CH=N–NH–⟨⟩ | 0.0005 | [1] 12 |
| | 0.001 | [2] 12 |

[1] 0% mortality.
[2] 90% mortality.

Tests with *Leptinotarsa decemlineata* (Colorado potato beetle)

Fresh potato greens are dipped in an acetone/water solution of active substance (depending on the solubility in water of the active substance it is previously dissolved in acetone, maximal ratio of water to acetone 50:50). After the coating of active substance has dried, they serve as feed. 20 larvae of *Leptinotarsa decemlineata* (1st stage) are placed on these potato greens and, on controlling daily, they are transferred to fresh greens which have been treated in the same way. The duration of the test is 10 days (temperature 28–30°).

In the following table there is given the time in days until 100% mortality is attained.

| | Concentration in percent | Time in days until 100% mortality is attained |
|---|---|---|
| Compound No. (from Table I): | | |
| 1 | 0.05 | 4 |
| 2 | 0.05 | 6 |
| 4 | 0.05 | 6 |
| 11 | 0.05 | 6 |
| 16 | 0.05 | 5 |
| 18 | 0.05 | 5 |
| Known compound: | | |
| 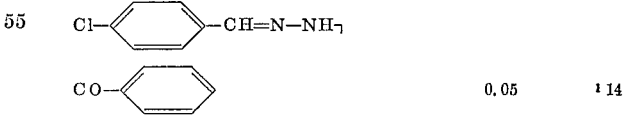 | 0.05 | [1] 14 |

[1] 75% mortality.

These tests showed that, a short time after taking the treated food, the larvae stop eating and die during the following days.

Pesticidal compositions according to the invention are produced by methods known per se by thoroughly mixing and milling the active substances of general Formula I with suitable carriers optionally with the addition of dispersing agents or solvents which are inert to the active substances. The active substances can be present and used as dusts, sprinkling agents, granulates such as coated granules, impregnated granules, homogeneous granules, wettable powders, pastes, emulsions, solutions or aerosols.

To produce the solid forms for use (dusts, sprinkling agents, granulates), the active substances are mixed with solid carriers. Examples of carriers are kaolin, talcum, bole, loess, chalk, limestone, ground limestone, ataclay, dolomite, diatomaceous earth, precipitated silicic acid, alkaline earth silicates, sodium and potassium aluminium silicates (feldspar and mica), calcium and magnesium sulphates, magnesium oxide, milled plastics, fertilisers such as ammonium sulphate, ammonium phosphates, ammonium nitrate, urea, ground vegetable products such as bran, bark dust, sawdust, ground nutshells, cellulose powder, residues of plant extractions, active charcoal etc. Each of these carriers can be used alone or admixed with each other.

The particle size of the carriers is, for dusts, advantageously up to about 0.1 mm., for sprinkling agents about 0.075 mm. to 0.2 mm. and for granulates from 0.2 mm. and 1 mm. (and larger).

As a general rule, the concentrations of active substance in the solid preparations is from 0.5–80%.

To these compositions can also be added additives which stabilise the active substance and/or nonionic, anionic and cationic surface active substances which, for example, improve the adhesion of the active substances on plants and parts thereof (glues, adhesives) and/or attain better wettability (wetting agents) and dispersibility (dispersing agents) of the active substances. Examples of such adhesive substances are as follows: olein plus hydrate of lime mixture, cellulose derivatives (methyl cellulose, carboxymethyl cellulose), hydroxyethyl glycol ethers of mono- and di-alkyl phenols having 5–15 ethylene oxide radicals per molecule and 8–9 carbon atoms in the alkyl radical, lignin sulphonic acids, their alkali and alkaline earth metal salts, polyethylene glycol ethers (Carbowaxes), fatty alcohol polyethylene glycol ethers having 5–20 ethylene oxide radicals per molecule and 8–18 carbon atoms in the fatty alcohol moiety, condensation products of ethylene oxide/propylene oxide, polyvinyl pyrrolidones, polyvinyl alcohols, condensation products of urea/formaldehyde as well as Latex products.

The concentrates of active substance which can be dispersed in water (wettable powders), pastes and emulsion concentrates, are agents which can be diluted with water to any concentration desired. They consist of active substance, carrier, optionally additives which stabilise the active substance, surface active substances and antifoaming agents, and, optionally, solvents. The concentration of active substance in these compositions is 5 to 80% (weight/volume).

Wettable powders and pastes are obtained by mixing and milling the active substances with dispersing agents and pulverulent carriers in suitable apparatus until homogeneity is attained. Carriers are, for example, those mentioned in the paragraph dealing with solid forms for application. In some cases it is advantageous to use mixtures of different carriers. The following can also be used, for example, as dispersing agents: condensation products of sulphonated naphthalene and sulphonated naphthalene derivatives with formaldehyde, condensation products of naphthalene or of naphthalene sulphonic acids with phenol and formaldehyde, also alkali, ammonium and alkaline earth metal salts of lignin sulphonic acid, in addition, alkylaryl sulphonates, alkali and alkaline earth metal salts of dibutyl naphthalene sulphonic acid, fatty alcohol sulphates such as salts of sulphated hexadecanols, heptadecanols, octadecanols, and salts of sulphated fatty alcohol glycol ethers, the sodium salt of oleoyl ethionate, the sodium salt of oleoyl methyl tauride, ditertiary acetylene glycols, dialkyldilauryl ammonium chloride and fatty acid alkali and alkaline earth metal salts.

Examples of antifoaming agents are silicones, such as Antifoam A (registered trademark).

The active substances are so mixed, milled, sieved and strained with the additives mentioned above that the solid particle size in wettable powders is 0.02–0.04 mm. and in pastes is not more than 0.003 mm. To produce emulsion concentrates and pastes, dispersing agents such as those given in the previous paragraphs, organic solvents and water are used. Examples of solvents are: alcohols, benzene, xylenes, toluene, dimethyl sulphoxide and mineral oil fractions boiling between 120 and 350° C. The solvents must be almost without smell, not phytotoxic, inert to the active substances and not easily inflammable.

In addition the compositions according to the invention can be used in the form of solutions. For this purpose, the active substance or several active substances of general Formula I are dissolved in suitable organic solvents, mixtures of solvents or in water. Aliphatic and aromatic hydrocarbons, chlorinated derivatives thereof, alkyl napthalenes alone or mixed with each other are used as organic solvents. The solutions should contain the active substances in a concentration from 1 to 20%.

The compositions according to the invention described can be mixed with other biocidally active compounds or compositions. Thus, to broaden the range of action, the new compositions, in addition to the compounds mentioned of general Formula I, can contain, e.g., insecticides, fungicides, bactericides, fungistatics, bacteriostatics or nematicides. The compositions according to the invention can also contain fertilisers, trace elements etc.

The following forms of compositions according to the invention serve to illustrate the present invention. Parts and percentages are given by weight.

GRANULATE

To produce a 5% granulate, the following components are used:

5 parts of $N_1$-acetyl-$N_2$-($\alpha$-methylbenzyl)-hydrazine,
1 part of nonyl-phenoxy polyethylene ethanol (Igepal CO630),
3 parts of spindle oil,
90 parts of ground limestone (0.4–0.8 mm. particle size),
1 part of kieselguhr.

The ground limestone is impregnated with the spindle oil and polyethylene ethanol and then mixed with the active substance. The kieselguhr is then added as anti-caking agent. The granulate obtained is suitable for plant and stock protection.

WETTABLE POWDERS

The following components are used for the production of 50% wettable powders:

50 parts of $N_1$ - isobutyryl-$N_2$-(4 - chloracetophenone)-hydrazone,
5 parts of a dialkylphenol-ethylene oxide condensate,
5 parts of a naphthalene sulphonic acid-phenol sulphonic acid-formaldehyde condensate,
4 parts of a 1:1 mixture of polyvinyl alcohol/kaolin,
20 parts of highly dispersed silicic acid,
16 parts of Champagne chalk.

The active substances are mixed with the additives in suitable mixers and milled on corresponding mills and rollers. Wettable powders are obtained which can be diluted with water to form suspensions of any concentration desired.

EMULSION CONCENTRATE

The following components are used to produce a 5% emulsion concentrate:

5 parts of $N_1$-methoxythiocarbonyl-$N_2$-(4-chlorobenzaldehyde)-hydrazone,
80 parts of ethylene glycol monomethyl ether,
15 parts of combined emulsifier consisting of the Ca salt of dodecylbenzene sulphonic acid and an alkylaryl polyglycol ether (e.g., "Emullat P 140 FP," produced by Union Chimique Belge S.A., Brussels).

The active substance dissolved in ethylene glycol monomethyl ether and the combined emulsifier is then added to this solution. An emulsion concentrate is obtained which can be diluted with water to any concentration desired. Such emulsions are suitable for the treatment of cultivated plants.

We claim:

1. A method for controlling insects, acarinae and preliminary stages of development thereof, which method comprises applying thereto an effective pesticidal amount of a compound of the formula

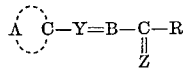

wherein

represents phenyl or phenyl substituted by a member selected from the group consisting of chlorine, bromine, methylenedioxy, cyano, nitro, amino, di-lower alkylamino, lower alkanoyl-amino, and lower alkyl, Y represents alkylidene of from 1 to 6 carbon atoms, B represents substituted or unsubstituted hydrazono wherein the substituents are selected from the group consisting of lower alkyl and lower alkenyl, Z represents oxygen or sulphur, and R represents alkyl of from 1 to 10 carbon atoms, alkenyl of from 2 to 5 carbon atoms having 1 or 2 double bonds, chloro-lower alkyl, lower alkoxy, lower alkylthio, or lower alkylamino.

2. A method as described in claim 1, wherein said compound is applied in a concentration of at least about 0.5 pound per acre, whereby insects in said area are caused to cease feeding within about 24 hours.

3. A method as described in claim 2, wherein the insect to be controlled is the Colorado potato beetle.

4. A method as described in claim 3, wherein said compound is $N_1$-isobutyryl-$N_2$-(4 - chloroacetophenone)-hydrazone.

5. A method as described in claim 3, wherein said compound is $N_1$ - methoxythiocarbonyl-$N_2$ - (4-chlorobenzaldehyde)-hydrazone.

6. A method for controlling insects, acarinae and preliminary stages of development thereof, which method comprises applying thereto an effective pesticidal amount of a compound of the formula

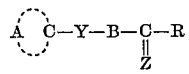

wherein

represents phenyl or phenyl substituted by a member selected from the group consisting of chlorine, bromine, methylenedioxy, cyano, nitro, amino, di-lower alkylamino, lower alkanoyl-amino, and lower alkyl, Y represents alkylene of from 1 to 6 carbon atoms, B represents substituted or unsubstituted hydrazino wherein the substituents are selected from the group consisting of lower alkyl and lower alkenyl, Z represents oxygen or sulphur, and R represents alkyl of from 1 to 10 carbon atoms, alkenyl of from 2 to 5 carbon atoms having 1 or 2 double bonds, chloro-lower alkyl, lower alkoxy, lower alkylthio, or lower alkylamino.

7. A method as described in claim 6 wherein said compound is applied in a concentration of at least about 0.5 pound per acre, whereby insects in said area are caused to cease feeding within about 24 hours.

8. A method as described in claim 7, wherein the insect to be controlled is the Colorado potato beetle.

9. A method as described in claim 8, wherein said compound is $N_1$ - acetyl-$N_2$-($\alpha$-methyl-benzyl)-hydrazine.

References Cited

UNITED STATES PATENTS

| | | | |
|---|---|---|---|
| 2,995,488 | 8/1961 | Jones et al. | 424—300 |
| 3,202,572 | 8/1965 | Werres et al. | 424—300 |
| 3,290,351 | 12/1966 | McKay et al. | 424—300 |
| 3,308,019 | 3/1967 | Kopf et al. | 424—300 |
| 3,060,192 | 10/1962 | Bernstein et al. | 260—326.3 |
| 3,063,900 | 11/1962 | Winsor | 167—65 |
| 3,162,680 | 12/1964 | Biel | 260—518 |
| 3,305,347 | 2/1967 | Minieri | 71—2.3 |

FOREIGN PATENTS

| | | | |
|---|---|---|---|
| 919,491 | 2/1963 | Great Britain | C07c |
| 1,019,120 | 2/1966 | Great Britain | C07c |

OTHER REFERENCES

King: U.S.D.A. Handbook No. 69, May 1954, p. 106.

ALBERT T. MEYERS, Primary Examiner

V. D. TURNER, Assistant Examiner

U.S. Cl. X.R.

424—282, 304, 309